United States Patent [19]

Fujita

[11] Patent Number: 4,700,064
[45] Date of Patent: Oct. 13, 1987

[54] TEMPERATURE VARYING OPTICAL MEASUREMENT DEVICE

[75] Inventor: Shigeru Fujita, Hyogo, Japan

[73] Assignee: Mitsubishi Denki Kabushiki Kaisha, Tokyo, Japan

[21] Appl. No.: 804,421

[22] Filed: Dec. 4, 1985

[30] Foreign Application Priority Data

Dec. 4, 1984 [JP] Japan ................................ 59-256853

[51] Int. Cl.$^4$ ............................................. G01K 11/18
[52] U.S. Cl. ................................ 250/231 R; 250/227; 374/131; 374/161
[58] Field of Search .................. 250/227, 231 R, 238; 350/96.15, 96.29; 374/130, 131, 159, 161, 162

[56] References Cited

U.S. PATENT DOCUMENTS

| 4,433,238 | 2/1984 | Adolfsson et al. | 250/227 |
| 4,607,158 | 8/1986 | Ovren | 250/227 |

FOREIGN PATENT DOCUMENTS 0139778  10/1979  Japan .................................. 374/131

Primary Examiner—Edward P. Westin
Attorney, Agent, or Firm—Sughrue, Mion, Zinn, Macpeak, and Seas

[57] ABSTRACT

An optical measurement device in which changes in the output wavelength of the light source do not affect the measurement accuracy. Values representing the output wavelength of the light source are stored in a signal processing device and used to correct the measurement result for errors otherwise induced by the changes in the wavelength of the light source output.

3 Claims, 7 Drawing Figures

TEMPERATURE VARYING OPTICAL MEASUREMENT DEVICE

BACKGROUND OF THE INVENTION

The present invention relates to an optical measuring device, and more particularly, to a temperature varying arrangement for measuring temperatures using a material having a property whereby the amount of light transmitted therethrough varies with temperature.

FIG. 1 shows a conventional temperature measuring device employing light. Designated at 1 is a light source, 2 an optical fiber, 3 a material having a property whereby the amount of light transmitted therethrough varies as a function of temperature, 4 a light detector, 5 a signal processor, 6 a display, and 1a a constant-temperature container surrounding the light source 1.

Light emitted from the light source 1 is guided by the optical fiber 2 to the temperature-measuring material 3. The light passes through the material 3 in an amount depending on the temperature, and then passes through the optical fiber 2 to the light detector 4. the light detector 4 converts the detected light to an electrical quantity, which is processed by the signal processor 5 to derive the temperature, which is then displayed on the display 6.

The temperature of the light source 1 is stabilized by the constant-temperature container 1a surrounding the light source 1. This is necesary because the wavelength of the light emitted from the light source 1 is generally affected by the temperature of the light source 1, resulting in an error in temperature measurement if the ambient temperature were to change.

Hence, the conventional temperature device requires the constant-temperature container 1a because the wavelength of the light source 1 has to be stabilized. Therefore, the device is expensive to construct and is large in size.

SUMMARY OF THE INVENTION

In view of this problem of the conventional device, it is an object of the present invention to provide an optical measurement device which needs no constant-temperature container, and hence which can be constructed less costly and made smaller in size.

According to an optical measurement device of the present invention, an LED is employed as a light source, and the output from a light detector is corrected by detecting the voltage across the LED in the forward-biased direction.

According to the present invention, the wavelength of light emitted from the LED and the voltage thereacross in the forward-biased direction have a certain relationship to each other, and the output of the light detectors is corrected by detecting the voltage in the forward-biased direction. Measuring errors arising from wavelength variations due to temperature changes of the LED can therefore be removed.

DESCRIPTION OF THE PREFERRED EMBODIMENTS

A preferred embodiment of the present invention will hereinafter be described.

Figure 1:
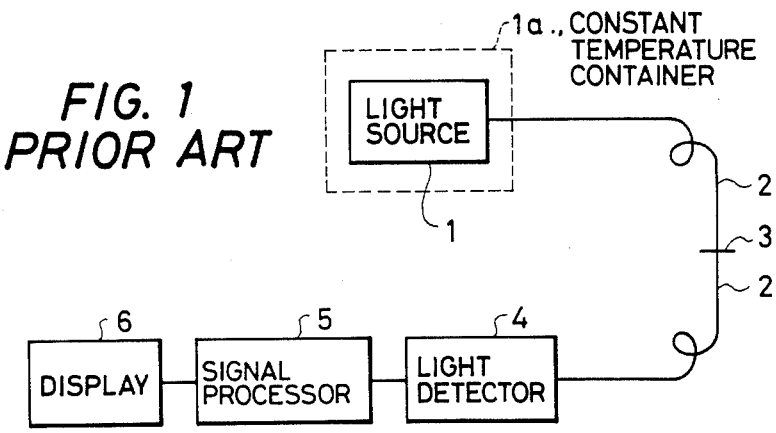
FIG. 1 is a block diagram of a conventional optical thermometer.
Figure 2:
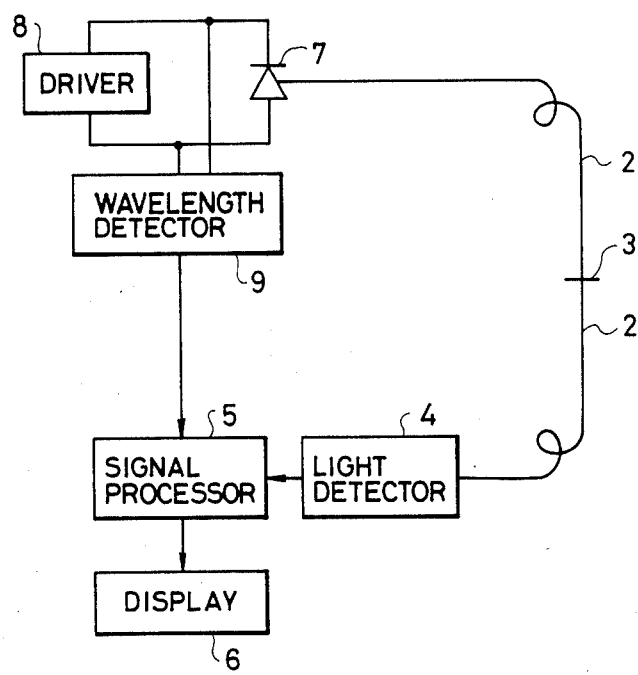
FIG. 2 is a block diagram showing a preferred embodiment of the present invention.

Designated in FIG. 2 at 2 in an optical fiber, 3 a material having a property whereby the amount of light transmitted therethrough varies as a function of temperature, 4 a light detector, 5 a signal processor, 6 a display, 7 an LED, 8 a driver including a constant-current regulated power supply for driving the LED 7, and 9 a wavelength detector for detecting the wavelength of light emitted from the LED 7.

The operation of the device shown in FIG. 2 will be described with reference to the characteristic diagrams of FIGS. 3A to 3D.

Figure 3A:
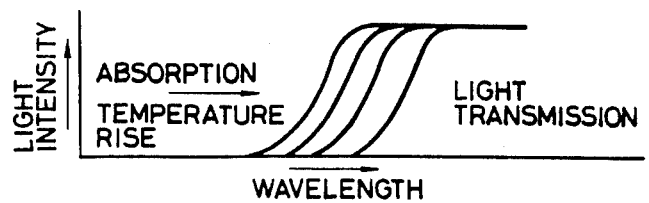
FIG. 3A is a diagram showing an absorption-edge wavelength as it shifts dependent on temperature.
Figure 3B:
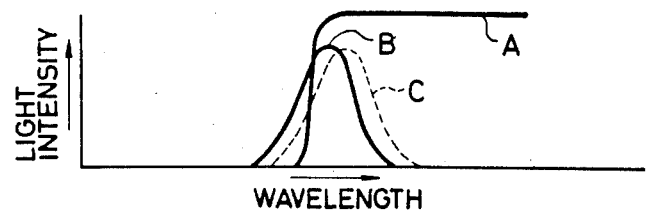
FIG. 3B is a diagram showing the relationship between a LED wavelength and an absorption-edge wavelength.
Figure 3C:
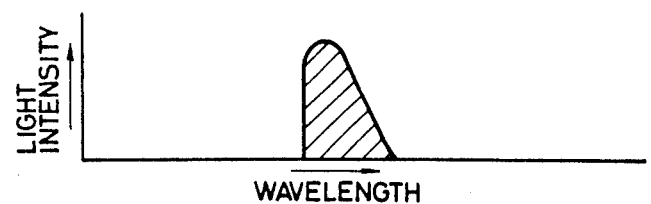
FIG. 3C is a diagram showing an amount of light transmitted with the curve B in FIG. 3B.
Figure 3D:
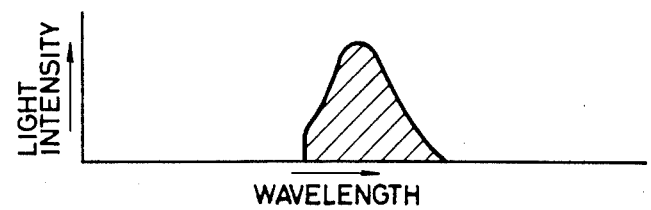
FIG. 3D is a diagram showing an amount of light transmitted with the curve C in FIG. 3B.

Light emitted from the LED 7 driven by the driver 8 is guided by the optical fiber 2 to the temperature-detecting material 3. The light transmission/absorption characteristic curve (absorption edge) shifts towards longer wavelengths as the temperature rises. FIG. 3B shows an absorption-edge wavelength A at a certain temperature of the material 3 and a wavelength curve B of the LED 7, and FIG. 3C illustrates the amount of light transmitted through the material 3 at this time. The light transmitted through the material 3 is converted by the light detector 4 to an electrical quantity. In the signal processor 5 is stored in advance data indicating amounts of light which can be transmitted through the material 3 for various respective temperatures. The actual temperature can thus be detected by comparing the detected amount of light with the stored amounts of light.

Figure 3E:
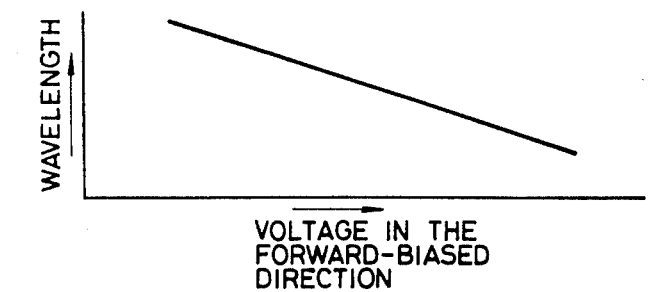
FIG. 3E is a diagram showing the relationship between a voltage across an LED in a forward-biased direction and the wavelength of the emitted light.

The wavelength of light emitted from the LED 7 is also a function of temperature. More specifically, as the ambient temperature of the LED 7 increases, the wavelength of the light emitted therefrom becomes longer, for example, for a certain temperature rise, the curve B changes to the curve C in FIG. 3B. The amount of light transmitted at this time also changes from the curve of FIG. 3C to the curve of FIG. 3D, and such a change produces an error. To compensate for this error, the voltage across the LED 7 in the forward-biased direction, i.e., the anode-cathode voltage of the LED 7, is measured by the wavelength detector 9. The relationship between the wavelength change caused by the ambient temperature of the LED 7 and the voltage thereacross in the forward-biased direction is illustrated in FIG. 3E. As the ambient temperature of LED 7 increases, the wavelength of light emitted therefrom become longer, and the voltage in the forward-biased direction decreases.

The voltage in the forward-biased direction is therefore closely related to the wavelength of light emitted from the LED 7. Thus, by storing in advance in the signal processor 5 the relationship between voltages in the forward-biased direction and errors, a corrective action can be carried out to thereby eliminate errors due to temperature changes of the LED 7. Therefore, a correct temperature can be displayed on the display 6 at all times.

While a temperature measurement has been described, the present invention is also applicable to various optical measurement devices incorporated in a voltmeter utilizing the Pockels effect, or an ammeter utilizing the Faraday effect, in which an error is produced when the wavelength of light emitted from the light source varies with temperature.

With the present invention, as described above, errors arising from wavelength changes due to temperature changes of the LED can be eliminated by correcting the measured value through detection of the voltage across the LED in the forward-biased direction. The light measurement device therefore requires no constant-temperature container, is inexpensive to construct, small in size, and is highly accurate in operation.

What is claimed is:

1. An optical measuring device comprising a constant current regulated power supply, an LED connected to and driven by said power supply, light detector means for detecting light emitted by said LED and passing through a material having a light transmitting characteristic which varies as a function of a predetermined parameter to be measured, signal processing means connected to said light detector and having stored therein the relationship between voltages across said LED and wavelength changes in the light emitted by said LED due to temperature changes of the LED, and voltage detecting means connected between said LED and said signal processing means for detecting a voltage across said LED and applying a signal to said signal processing means for correcting the output signal from said light detector means to remove measurement error arising from wavelength changes due to temperature changes of said LED for computing said parameter.

2. The optical measurement device according to claim 1, wherein said predetermined parameter is temperature, and the amount of light transmitted through said material varies as a function of temperature.

3. The optical measurement device according to claim 1, wherein said signal processing means stores values representing an output wavelength of said LED as a function of temperature.

* * * * *